United States Patent
Smits

(10) Patent No.: US 11,498,798 B2
(45) Date of Patent: *Nov. 15, 2022

(54) CREEL AND A METHOD

(71) Applicant: VMI HOLLAND B.V., Epe (NL)

(72) Inventor: Marcel Smits, Epe (NL)

(73) Assignee: VMI HOLLAND B.V.

( * ) Notice: Subject to any disclaimer, the term of this patent is extended or adjusted under 35 U.S.C. 154(b) by 161 days.

This patent is subject to a terminal disclaimer.

(21) Appl. No.: 17/099,619

(22) Filed: Nov. 16, 2020

(65) Prior Publication Data

US 2021/0101773 A1 Apr. 8, 2021

Related U.S. Application Data

(62) Division of application No. 16/498,332, filed as application No. PCT/NL2018/050190 on Mar. 28, 2018, now Pat. No. 10,870,553.

(30) Foreign Application Priority Data

Mar. 30, 2017 (NL) ...................................... 2018606

(51) Int. Cl.
*B65H 49/32* (2006.01)
*B65H 57/12* (2006.01)
(Continued)

(52) U.S. Cl.
CPC ............. *B65H 59/04* (2013.01); *B65H 49/32* (2013.01); *B65H 51/16* (2013.01); *B65H 57/12* (2013.01);
(Continued)

(58) Field of Classification Search
CPC ........ B65H 59/04; B65H 49/32; B65H 51/12; B65H 57/12; B65H 67/02; B65H 2701/36; B65H 2801/93; F16D 49/08
See application file for complete search history.

(56) References Cited

U.S. PATENT DOCUMENTS

| 1,580,270 A | 4/1926 | Williams | |
|---|---|---|---|
| 3,531,849 A | 10/1970 | Bishop et al. | 29/428 |

(Continued)

FOREIGN PATENT DOCUMENTS

| CN | 1130927 | 9/1996 | B01H 1/00 |
|---|---|---|---|
| CN | 201317858 | 9/2009 | D04C 3/02 |

(Continued)

OTHER PUBLICATIONS

Office Action issued Taiwan Patent Appln. Serial No. 107111009, dated Oct. 4, 2021, with machine English translation, 6 pages.
(Continued)

*Primary Examiner* — William E Dondero
(74) *Attorney, Agent, or Firm* — Hayes Soloway P.C.

(57) ABSTRACT

Disclosed is a creel including a plurality of creel bobbins, a plurality of guiding tubes located at the lower end of the creel and a plurality of guiding tubes located at the upper end of the creel, wherein each guiding tube is arranged for receiving a wire from an individual creel bobbin, wherein the lower half of the creel bobbins are arranged to feed their wires to the guiding tubes at the upper end of the creel, while the upper half of the creel bobbins are arranged to feed their wires to the guiding tubes at the lower end of the creel.

4 Claims, 18 Drawing Sheets

(51) Int. Cl.
  *B65H 51/16* (2006.01)
  *B65H 59/04* (2006.01)
  *B65H 67/02* (2006.01)
  *F16D 49/08* (2006.01)

(52) U.S. Cl.
  CPC ............ *B65H 67/02* (2013.01); *F16D 49/08* (2013.01); *B65H 2701/36* (2013.01); *B65H 2801/93* (2013.01)

(56) References Cited

U.S. PATENT DOCUMENTS

| 5,613,643 | A | * | 3/1997 | Weiner | D02H 1/00 |
| | | | | | 242/157 R |
| 5,749,210 | A | | 5/1998 | Kikuchi et al. | 57/105 |
| 7,731,119 | B2 | | 6/2010 | Heaney et al. | B65H 67/00 |
| 2004/0050995 | A1 | * | 3/2004 | Ingram, III | D05C 15/18 |
| | | | | | 242/594.6 |
| 2010/0187349 | A1 | | 7/2010 | Pemberton | 242/566 |
| 2011/0308438 | A1 | * | 12/2011 | Ingram, III | D05C 15/18 |
| | | | | | 242/130 |
| 2013/0228644 | A1 | * | 9/2013 | Willis | D05C 15/18 |
| | | | | | 242/615.3 |
| 2014/0346271 | A1 | | 11/2014 | Tanigawa et al. | 242/566 |
| 2015/0048199 | A1 | | 2/2015 | Slezak | 65/49 |

FOREIGN PATENT DOCUMENTS

| CN | 101631666 | 1/2010 | ............ B29D 30/38 |
| CN | 101805949 | 8/2010 | ............ D02H 1/00 |
| CN | 201883266 | 6/2011 | ............ D04C 3/14 |
| CN | 202347232 | 7/2012 | ............ D04C 3/00 |
| CN | 104118760 | 10/2014 | ............ B65H 49/18 |
| CN | 104370159 | 2/2015 | ............ B65H 57/00 |
| CN | 204939767 | 1/2016 | ............ D04B 15/42 |
| CN | 105568466 | 5/2016 | ............ D02H 1/00 |
| CN | 106044362 | 10/2016 | ............ B65H 54/02 |
| DE | 50840 | 2/1890 | ............ F16D 49/10 |
| EP | 0 614 752 | 9/1994 | ............ B29D 30/38 |
| EP | 2 837 591 | 2/2015 | ............ B65H 49/32 |
| EP | 3 124 196 | 2/2017 | ............ B29C 43/28 |
| FR | 2 359 319 | 2/1978 | ............ F16D 65/04 |
| GB | 166902 | 1/1922 | |
| GB | 258844 | 12/1926 | ............ D02H 1/00 |
| GB | 1 570 438 | 7/1980 | ............ B23P 17/00 |
| GB | 2528885 | 2/2016 | ............ D03D 49/16 |
| IT | 8267231 | 3/1982 | |
| IT | MI20011909 | 9/2001 | |
| JP | S54-172978 | 12/1979 | ............ A61F 7/00 |
| JP | 56-90761 | 7/1981 | ............ B60T 8/26 |
| JP | S56-83861 | 7/1981 | ............ G11B 15/43 |
| JP | S61-60571 | 3/1986 | ............ B65H 59/04 |
| JP | 6-297601 | 10/1994 | ............ B29D 30/38 |
| JP | 2000-136488 | 5/2000 | ............ B29C 47/02 |
| JP | 2004-34495 | 2/2004 | ............ B29C 47/02 |
| JP | 2007-70759 | 3/2007 | ............ D02H 7/00 |
| JP | 2009-511392 | 3/2009 | ............ B65H 49/16 |
| JP | 2009-234777 | 10/2009 | ............ B65H 49/32 |
| KR | 101556732 | 10/2015 | ............ D02H 1/00 |
| WO | WO 00/27532 | 5/2000 | ............ B02C 15/00 |
| WO | WO 2008/056980 | 5/2008 | ............ B65H 51/10 |
| WO | WO 2008/105656 | 9/2008 | ............ B29D 30/38 |
| WO | 2008/131252 | 10/2008 | ............ B65H 49/16 |
| WO | 2013/039155 | 3/2013 | ............ B65H 57/14 |

OTHER PUBLICATIONS

U.S. Appl. No. 16/498,332, filed Sep. 26, 2019.
Anonymous: "Creel tension device", Research disclosure, Kenneth Mason Publications, Hampshire, UK, GB, vol. 275, No. 24, Mar. 1, 1987, XP007111393, ISSN: 0374-4353.
International Search Report and Written Opinion issued in application No. PCT/NL201 8/050190, dated Aug. 22, 2018 (23 pgs).
Japanese Official issued in related Japanese Patent Application Serial No. 2019-553087, dated Sep. 23, 2020 with machine translation (4 pages).
Decision to Grant issued in related South Korean Patent Application Serial No. 10-2020-7024215, dated Sep. 4, 2020 with machine translation (15 pages).
International Preliminary Report on Patentability issued in PCT/NL2018/050190, dated Oct. 1, 2019, 17 pages.
Korean Decision to Grant issued in corresponding Korean Patent Application Serial No. 10-2019-7000793, dated May 28, 2020 with translation (6 pgs).
Notice of Allowance issued in U.S. Appl. No. 16/498,332, dated Aug. 17, 2020, 21 pages.
Notice of Allowance issued in U.S. Appl. No. 16/498,332, dated Oct. 29, 2020, 8 pages.
First Office Action issued in Chinese Patent Appln. Serial No. 202110552483.6, dated Jun. 24, 2022, with English translation. 15 pages.

* cited by examiner

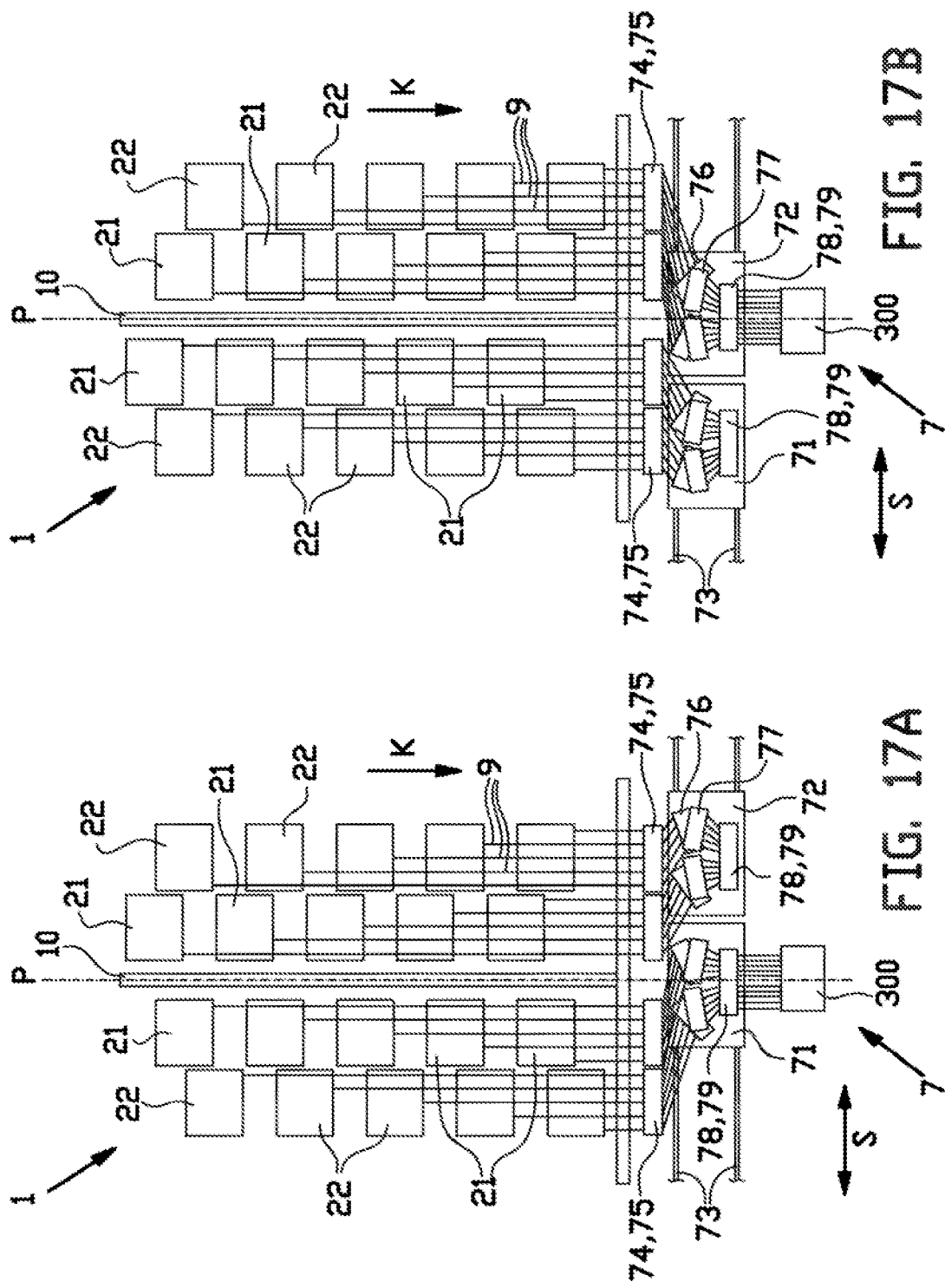

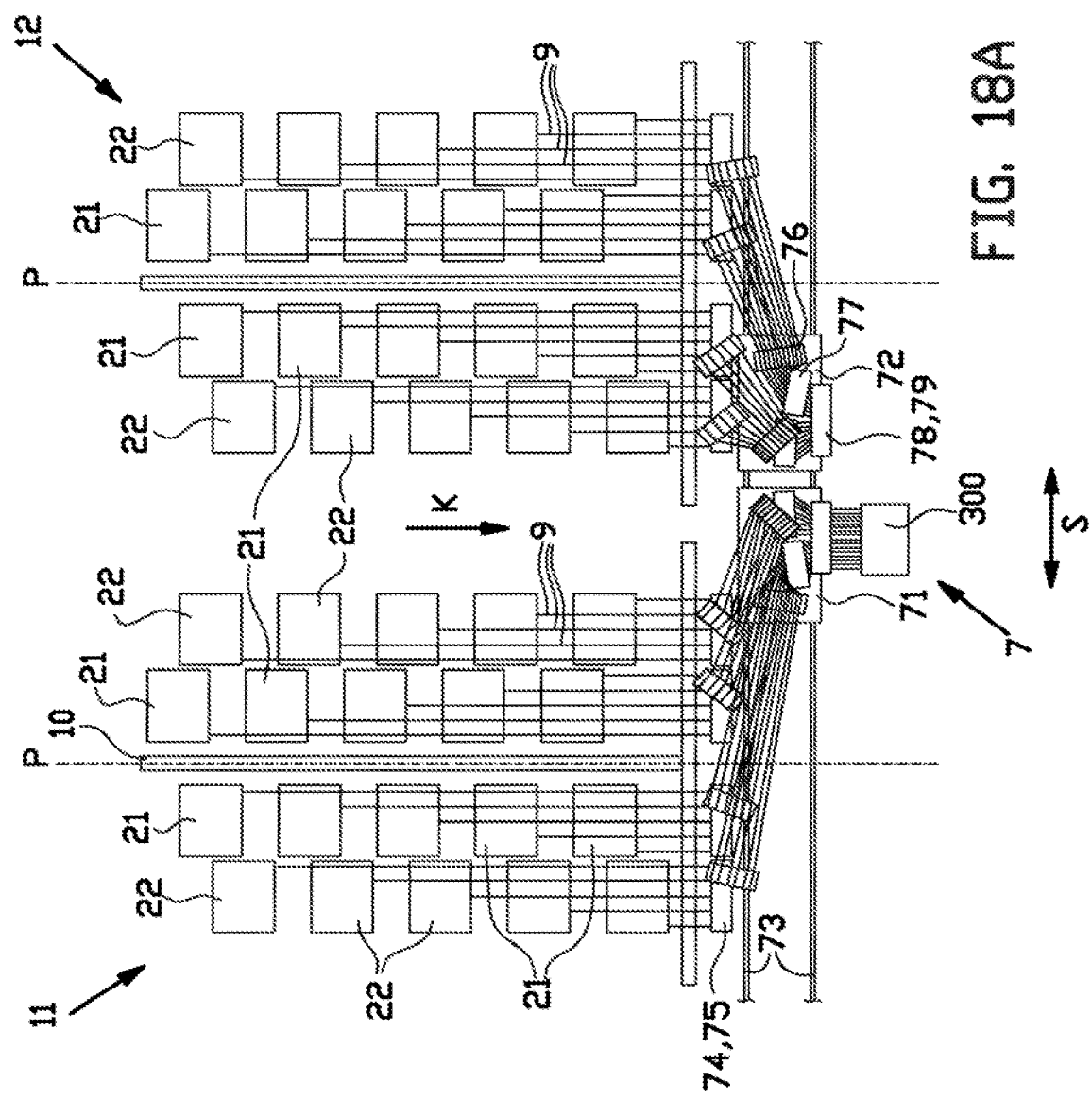

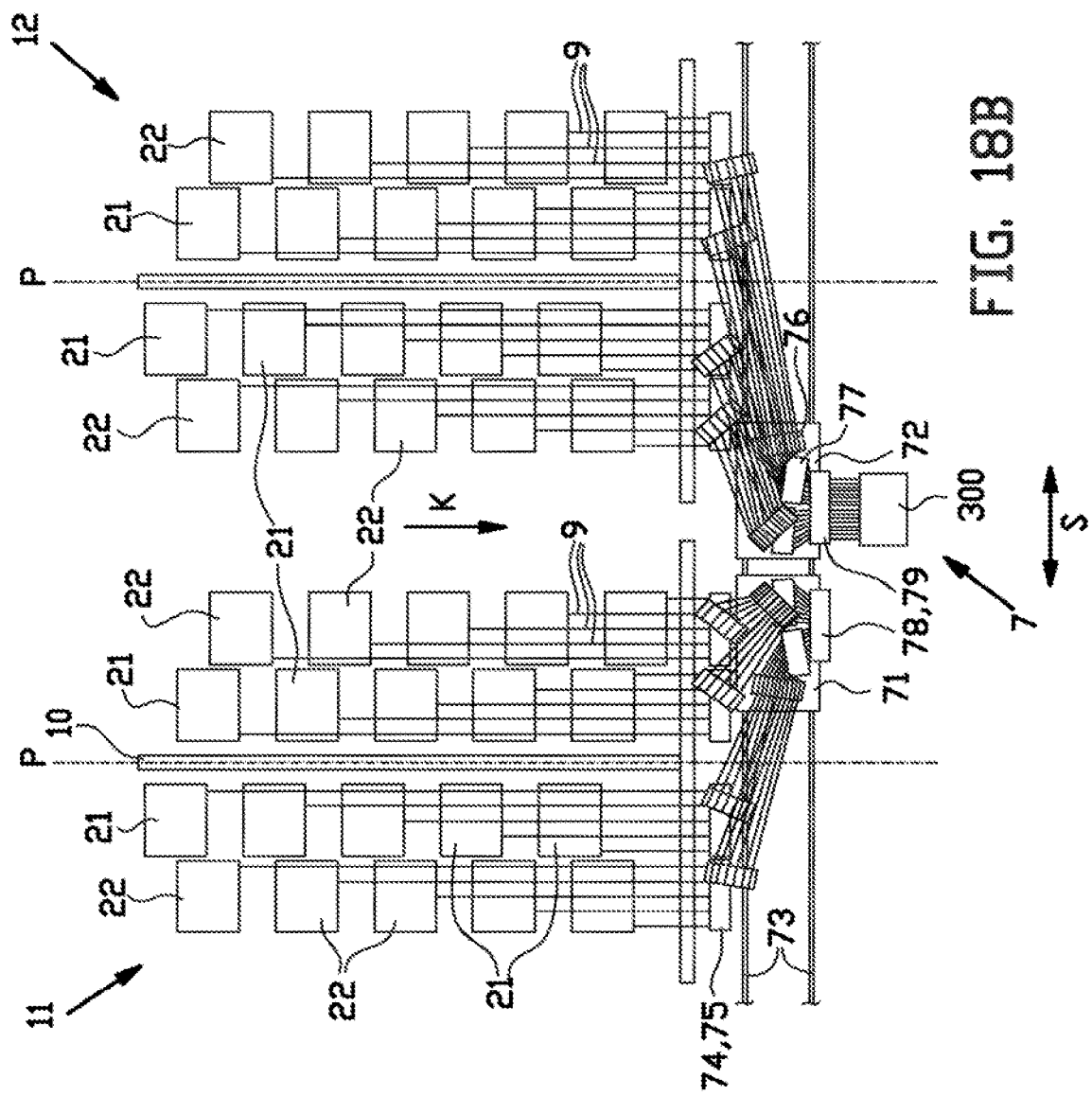

CREEL AND A METHOD

CROSS REFERENCE TO RELATED APPLICATION

This application is a divisional application of U.S. patent application Ser. No. 16/498,332, filed Sep. 26, 2019, which in turn claims priority to PCT International Patent Application Serial No. PCT/NL2018/050190, Filed Mar. 28, 2018, the contents of which are incorporated herein by reference.

BACKGROUND

The invention relates to a creel and a method. With tire designs featuring increasingly wider tires, cord or wire reinforced tire components have grown increasingly wider as well, embedding more and more reinforcement wires. As each reinforcement wire is supplied from an individual creel bobbin, the number of creel bobbins has been steadily increasing. Currently, a creel may contain several hundreds of creel bobbins. Each creel bobbin has to be braked individually to ensure uniform tension in all wires. Consequently the complexity, costs and footprint of a creel have been increasing dramatically. Hence, there is a need to reduce the complexity, the costs and/or the footprint of a creel.

It is an object of the present invention to provide a a creel and a method, wherein the complexity, costs and/or footprint of the creel can be reduced.

SUMMARY OF THE INVENTION

The invention provides a creel comprising a plurality of creel bobbins, a plurality of guiding tubes located at the lower end of the creel and a plurality of guiding tubes located at the upper end of the creel, wherein each guiding tube is arranged for receiving a wire from an individual creel bobbin, wherein the lower half of the creel bobbins are arranged to feed their wires to the guiding tubes at the upper end of the creel, while the upper half of the creel bobbins are arranged to feed their wires to the guiding tubes at the lower end of the creel. Hence, the overall height of the creel can be reduced.

In an embodiment, for each guiding tube receiving a wire from said individual creel bobbin, the wire in use extends from the creel bobbin towards the guiding tube at a fleet angle with respect to an imaginary center line normal to the axial direction of the creel bobbin, wherein the wire extends at a maximum fleet angle when the wire is unwinding from the extreme left and the extreme right of the creel bobbin, wherein the creel bobbin has a bobbin width and a minimum distance between the circumference of the creel bobbin and the guiding tube, wherein the bobbin width and the minimum distance are chosen such that the maximum fleet angle is less than ten degrees. Hence, the optimal fleet angle can be obtained.

Preferably, the maximum fleet angle is less than five degrees or less than three degrees.

The invention further provides a method using the aforementioned creel, wherein the method comprises the steps of:
- feeding the wires of the lower half of the creel bobbins to the guiding tubes at the upper end of the creel; and
- feeding the wires of the upper half of the creel bobbins to the guiding tubes at the lower end of the creel.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of exemplary embodiments shown in the attached schematic drawings, in which:

FIGS. 17A and 17B show top views of a single creel in combination with the aforementioned wire collector; and FIGS. 18A and 18B show top view of a double creel in combination with the aforementioned wire collector.

DETAILED DESCRIPTION OF THE INVENTION

Figure 1:
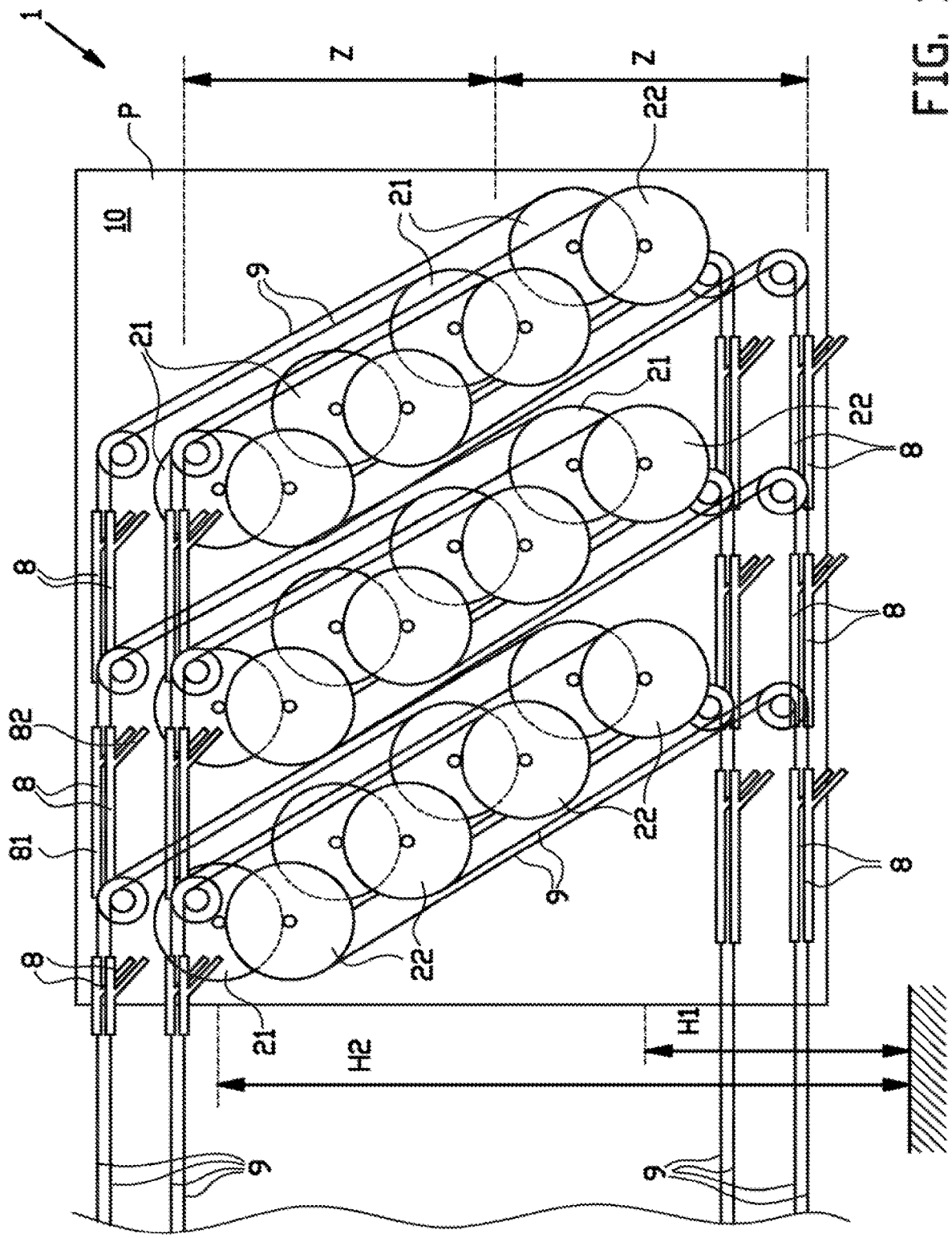
FIG. 1 shows a front view of a creel according to a first embodiment of the invention with a plurality of first creel bobbins and a plurality of second creel bobbins.

FIG. 1 shows a creel 1 according to a first embodiment of the invention. The creel 1 comprises a creel wall 10 that defines a creel plane P and a plurality of first reels or bobbins 21 and second reels or bobbins 22 rotatably mounted to said creel wall 10 at the same side of said creel plane P. Each bobbin 21, 22 holds a plurality of windings of a cord or a wire 9 that is arranged to be unwound from the respective bobbin 21, 22 and guided through the creel 1 via a wire collector (not shown) towards an extruder (not shown) for embedding into rubber to form a reinforced rubber ply (not shown) for use in tire building. The wires 9 are preferably made from metal or fabric in accordance with the desired specifications of the tire component. The wires 9 should be supplied to the extruder at substantially the same tension to prevent deformation in the reinforced rubber ply.

Figure 2:
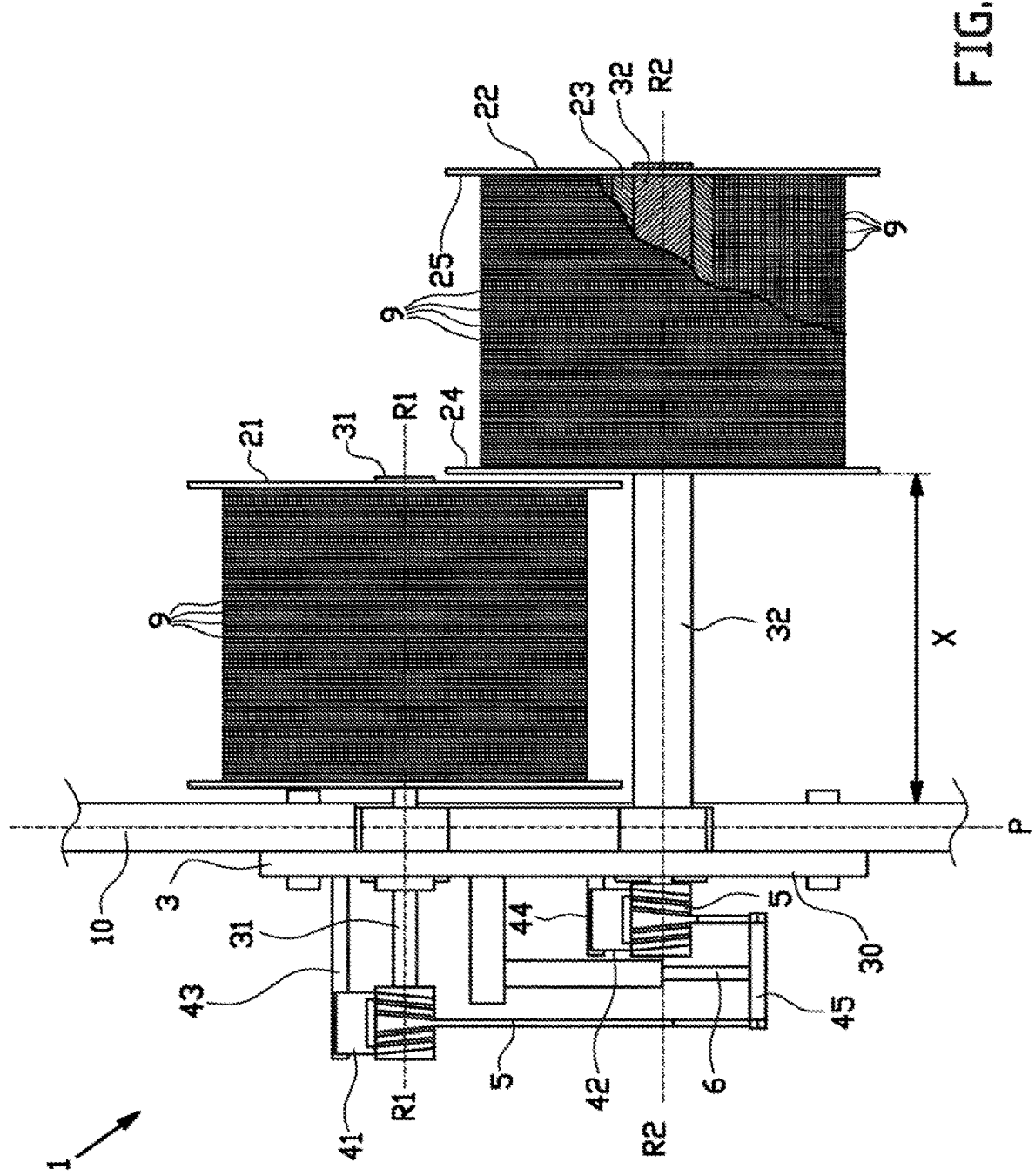
FIG. 2 shows a side view of a creel bobbin holder for holding a set of a first creel bobbin and a second creel bobbin, wherein the second creel bobbin is shown partially in cross section.

As shown in the partial cross section of FIG. 2, each creel bobbin 21, 22 comprises a hub 23 that defines central axis of the respective creel bobbin 21, 22 and a set of flanges 24, 25 that contain the wire 9 on the respective creel bobbin 21, 22 in an axial direction parallel to the central axis. The creel 1 comprises a plurality of creel bobbin assemblies 3 for holding the plurality of creel bobbins 21, 22. One of said creel bobbin assemblies 3 is shown in more detail in FIG. 2. Each creel bobbin assembly 3 is provided with a first shaft 31 and a second shaft 32 that define a first rotation axis R1 and a second rotation axis R2, respectively. Each of the first creel bobbins 21 and the second creel bobbins 22 is arranged to be placed with its central hub 23 on a respective one of the first shafts 31 and the second shafts 32, respectively, such that its central axis is aligned with the rotation axis R1, R2 defined by said one shaft 31, 32. Each creel bobbin 21, 22 is rotationally fixed with respect to its respective shaft 31, 32 so as to be rotatable together with said shaft 31, 32 about the respective rotation axis R1, R2.

In this exemplary first embodiment, each creel bobbin assembly 3 comprises a set of one of the first shafts 31 and one of the second shafts 32 and a common base member 30 for rotatably supporting the set of shafts 31, 32 with respect to the creel wall 10. The base member 30 is mounted to the creel wall 10 with suitable fasteners, e.g. bolts. Hence, the set of two shafts 31, 32 can be mounted simultaneously by attaching the base member 30 to the creel wall 10. Alternatively, the shafts 31, 32 may be directly supported on and/or mounted to the creel wall 10, in which case the base member is formed by the creel wall 10 itself.

As shown in FIG. 2, the first shaft 31 and the second shaft 32 of the creel bobbin assembly 3 are mutually parallel yet spaced apart in a direction parallel to the creel plane P. As a result, the first rotation axis R1 and the second rotation axis R2 are offset with respect to each other in the direction parallel to the creel plane P. Furthermore, the second shaft 32 is considerably longer than the first shaft 31 to protrude beyond the first shaft 31 and to support the second creel bobbin 22 at a spacing distance X spaced apart from the creel plane P. Preferably, said spacing distance X is sufficient to allow for intermediate placement of the first creel bobbin 21 between the second creel bobbin 22 and the creel plane P, such that the first creel bobbin 21 can just rotate freely with respect to the second creel bobbin 22. Hence, the first creel bobbin 21 and the second creel bobbin 22 can be placed side-by-side in an at least partially overlapping arrangement. The first shaft 31 and the second shaft 32 can thus be position closer to each other in a direction parallel to the creel plane P. In particular, the first shaft 31 and the second shaft 32 can be spaced apart in a direction parallel to the creel plane P over a distance of less than two-thirds of the diameter of the creel bobbins 21, 22 such that the creel bobbins 21, 22 overlap each other by at least one-third of said diameter.

As shown in FIG. 2, the shafts 31, 32 that support the creel bobbins 21, 22 on one side of the creel plane P extend through said creel plane P to the opposite side of the creel plane P. The creel bobbin assembly 3 further comprises a first creel bobbin brake 41 and a second creel bobbin brake 42 which are arranged at said opposite side of the creel plane P for braking the shafts 31, 32 of the creel bobbin 21, 22. The creel bobbin brakes 41, 42 are arranged for applying a braking torque to the shafts 31, 32 of the respective creel bobbins 21, 22 to control the tension in each individual wire 9 as they are being unwound from the respective creel bobbin 21, 22.

The creel bobbin assembly 3 as a whole, together with the creel bobbin brakes 41, 42 that are associated with the shafts 31, 32 of said base member 30, form a replaceable unit that can be easily replaced as a whole by simply dismounting the base member 30 from the creel wall 10.

Figure 13:
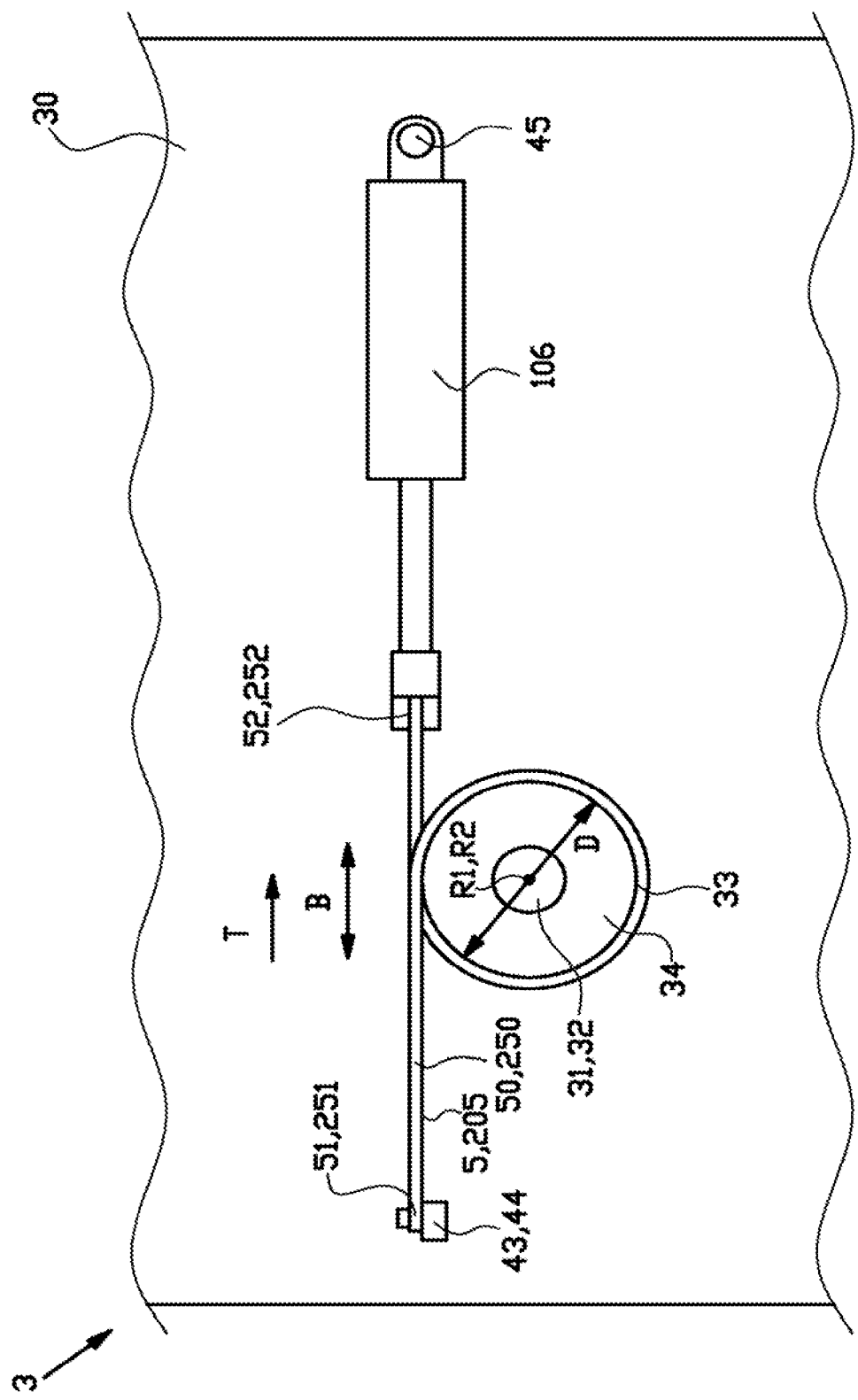
FIG. 13 shows a rear view of the creel bobbin brake or the alternative creel bobbin brake in the mounted state of FIG. 5 or 9, respectively.

FIGS. 3-6 show an exemplary one of the creel bobbin brakes 41, 42 in more detail. Each creel bobbin brake 41, 42 comprises a strap 5 that is arranged to be wound around the shaft 31, 32 of the respective creel bobbin 21, 22. The strap 5 comprises a first end 51, a second end 52 opposite to the first end 51 and a strap body 50 extending in a longitudinal direction B between the first end 51 and the second end 52. Preferably, the strap body 50 is integrally formed and/or made from a single piece of material. The material of the strap body 50 preferably comprises reinforced synthetic resin or rubber based material. Alternatively, the strap body 50 may comprise leather. The shaft 31, 32 is provided with a brake surface 33 that extends circumferentially about the respective rotation axis R1, R2. In this exemplary embodiment, said brake surface 33 is formed by a brake drum 34 that is arranged on and rotationally fixed to the shaft 31, 32. Alternatively, the shaft 31, 32 itself may form the brake surface 33. As shown in FIG. 13, the brake surface has a diameter D and a circumference equal to the diameter D multiplied by pi. The strap body 50 is arranged to wound around said brake surface 33.

Figure 3:
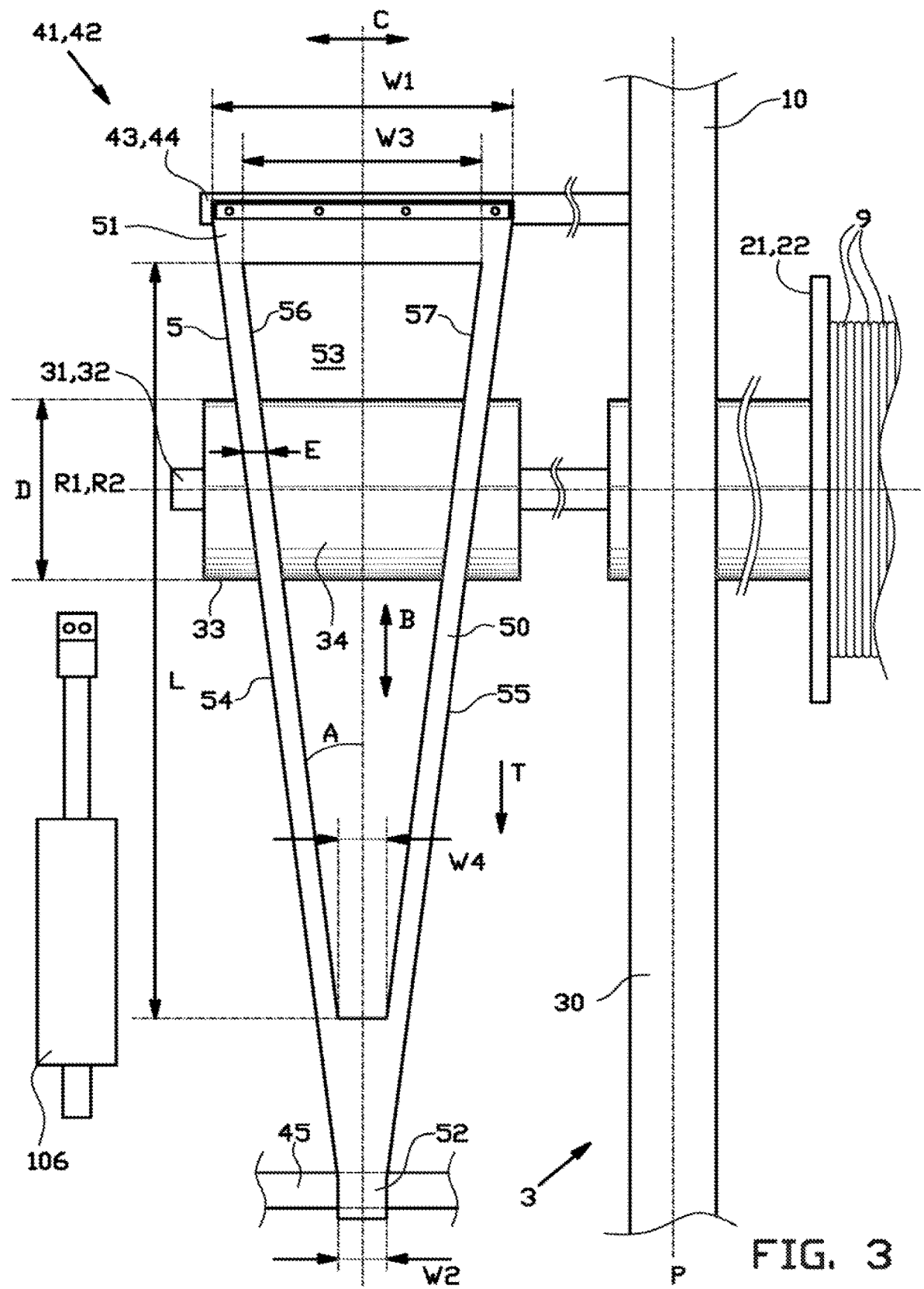
FIG. 3 shows the creel bobbin holder with a creel bobbin brake for braking one of the creel bobbins held by said creel bobbin holder.

As shown in FIG. 3, the strap 5 is provided with a first outer edge 54 and a second outer edge 55 tapering towards each other from the first end 51 towards the second end 52 on opposite sides of the strap body 50. The strap 5 further comprises an opening 53 in the strap body 50. Said opening 50 is defined by a first inner edge 56 and a second inner edge 57 tapering towards each other from the first end 51 towards the second end 52 on opposite sides of the opening 53. Both the strap body 50 and the opening 53 taper in a tapering direction T parallel to the longitudinal direction B from the first end 51 towards the second end 52. The strap body 50 tapers from a largest width W1 at the first end 51 to a smallest width W2 at the second end 52. The opening 53 also tapers from a largest width W3 to a smallest width W4. Preferably, both the strap body 50 and the opening 53 taper linearly at the same taper angle A. Hence, the first outer edge 54 and the first inner edge 56 remain parallel or substantially parallel and the second outer edge 55 and the second inner edge 57 remain parallel or substantially parallel. In this exemplary embodiment, the smallest width W2 of the strap body 50 at the second end 52 is equal to or smaller than the smallest width W4 of the opening 53.

As shown in FIGS. 3-6, the strap 5 is arranged to be wound over multiple revolutions, e.g. multiple 360 degree windings, about the shaft 31, 32. In particular, it has been found that winding the strap 5 over at least one and a half revolutions, e.g. at least a 540 degree winding, a winding of at least 720 degrees or at least three 360 degree windings, about the shaft 31, 32 makes the brake torque independent from the friction between the strap 5 and the brake surface 33. With said at least one and a half revolutions, the brake torque can be made solely dependent on tension in the strap 5 and the diameter of the brake surface 33. The strap 5 according to the present invention is arranged to be wound over at least one and a half revolutions while the second end 52 is inserted and/or pulled through the same opening 53 with each revolution. By inserting the second 52 through the same opening 53 with each revolution, the subsequent windings can take place symmetrically, e.g. in the same plane parallel to the longitudinal direction B of the strap 5. This reduces the tendency of strap 5 to run off to one side of the brake surface 33.

As shown in FIG. 3, the strap body 50 is symmetrical or substantially in a lateral direction C perpendicular to the longitudinal direction B of the strap body 50. Again, due to said symmetry, the strap body 50 is less likely to run off to a side of the brake surface 33 in said lateral direction C.

Moreover, as shown in FIG. 3-6, the first outer edge 54, the second outer edge 55, the first inner edge 56 and the second inner edge 57 taper inwards in the lateral direction C over each revolution with a pitch distance E. The distance between the first outer edge 54 and the first inner edge 56 and the distance between the second outer edge 55 and the second inner edge 57 in said lateral direction C, i.e. the width of the strap body 50 between said first outer edge 54 and said first inner edge 56 and the width of the strap body 50 between the second outer edge 55 and the second inner edge 57 in said lateral direction C, is chosen to be equal to or smaller than said pitch distance E. Consequently, with each subsequent revolution after the first revolution, the first outer edge and the second outer edge 55 are arranged to extend alongside the first inner edge 56 and the second inner edge 57, respectively. Preferably, the smallest width W2 of the strap body 50 at the second end 52 is equal to or smaller than twice the pitch distance E.

Figure 5:
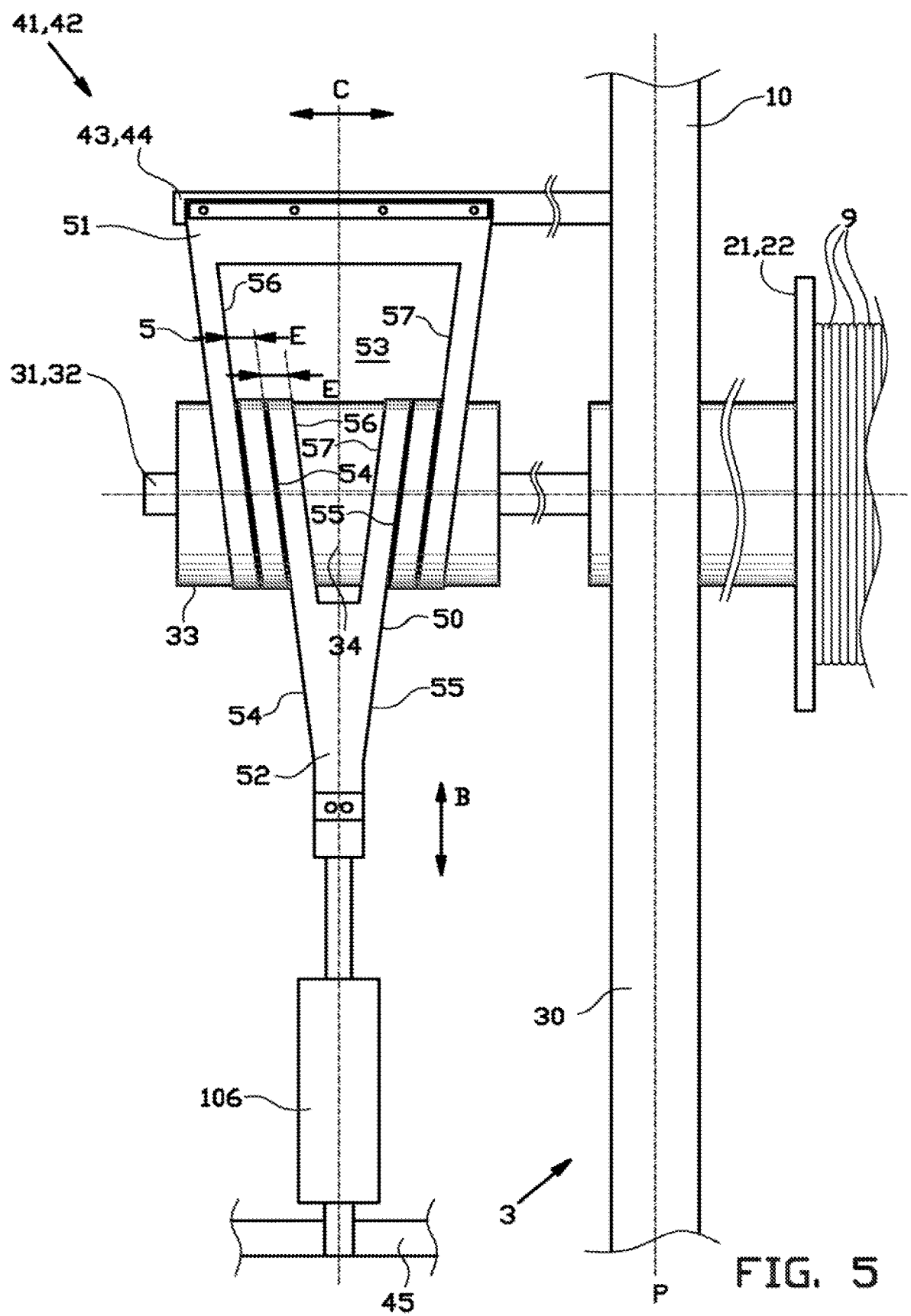
Figure 6:
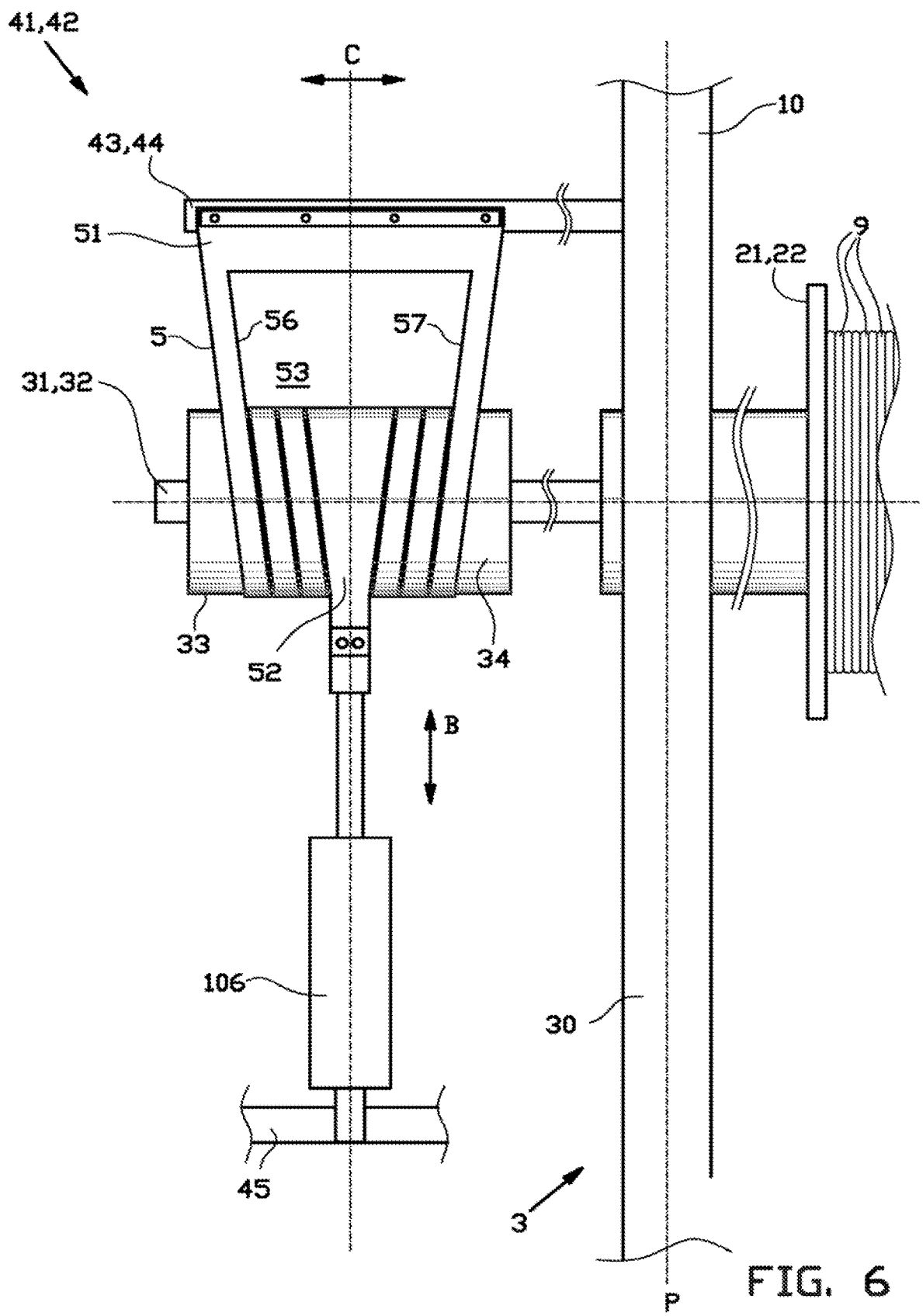
FIG. 6 shows in side view an optional additional step of mounting the creel bobbin brake to the creel bobbin holder of FIG. 2.

In the step of FIG. 5 the strap 5 has been wound about the shaft 31, 32 about two revolutions. Depending however on the friction characteristics of the material that has been chosen for the strap 5 it may be advantageous to wind the strap 5 around the shaft 31, 32 over an additional revolution to make the brake torque solely dependent on the tension in the strap 5, e.g. in the case of reinforced synthetic resin or rubber based material. Hence, FIG. 6 shows the optional step of winding the strap 5 over an additional revolution to arrive at a total of at least three windings about the shaft 31, 32.

As shown in FIG. 3, the opening 53 has a length L in the longitudinal direction B that is equal to or larger than two times the circumference of the brake surface 33, i.e. two times the diameter D of the brake surface 33 multiplied by pi. This allows for the second end to be wound around the brake surface 33 and to be inserted through the same opening 53 over at least one and a half revolutions, preferably at least two revolutions and optionally at least three revolutions.

As shown in FIG. 2, each creel bobbin brake 41, 42 further comprises a first mounting member 43, 44 and a second mounting member 45 for mounting the first end 51 and the second end 52, respectively, to the base member 30 and/or the creel wall 10. In this exemplary embodiment, the first mounting member 43, 44 extends on an opposite side of the respective rotation axis R1, R2 with respect to the second mounting member 45 for mounting the first end 51 and the second end 52 to the base member 30 and/or the creel wall 10 on opposite sides of said respective rotation axis R1, R2. In the steps as shown in FIGS. 3-6, the first end 51 is mounted to the first mounting member 43, 44 first. Subsequently, the second end 52 is inserted and pulled through the opening 53 in the strap body 50 three times. Said second end 52 is then mounted to the second mounting member 45. In this exemplary embodiment, the second ends 52 of the straps 5 of both creel bobbin brakes 41, 42 are directly mounted to the same second mounting member 45. The second mounting member 45 is in turn connected to the base member 30 and/or the creel wall 10 via a tensioner 6 that is arranged to pull on said second mounting member 45 with respect to the base member 30 and/or the creel wall 10. Hence, with the use of a single tensioner 6, both straps 5 can be tensioned simultaneously.

Alternatively, the second mounting member 45 may be stationary with respect to the base member 30 and/or the creel wall 10 and individual tensioners 106 (as shown in FIG. 5) may be provided between the second end 52 of each strap 5 and the second mounting member 45.

Figure 7:
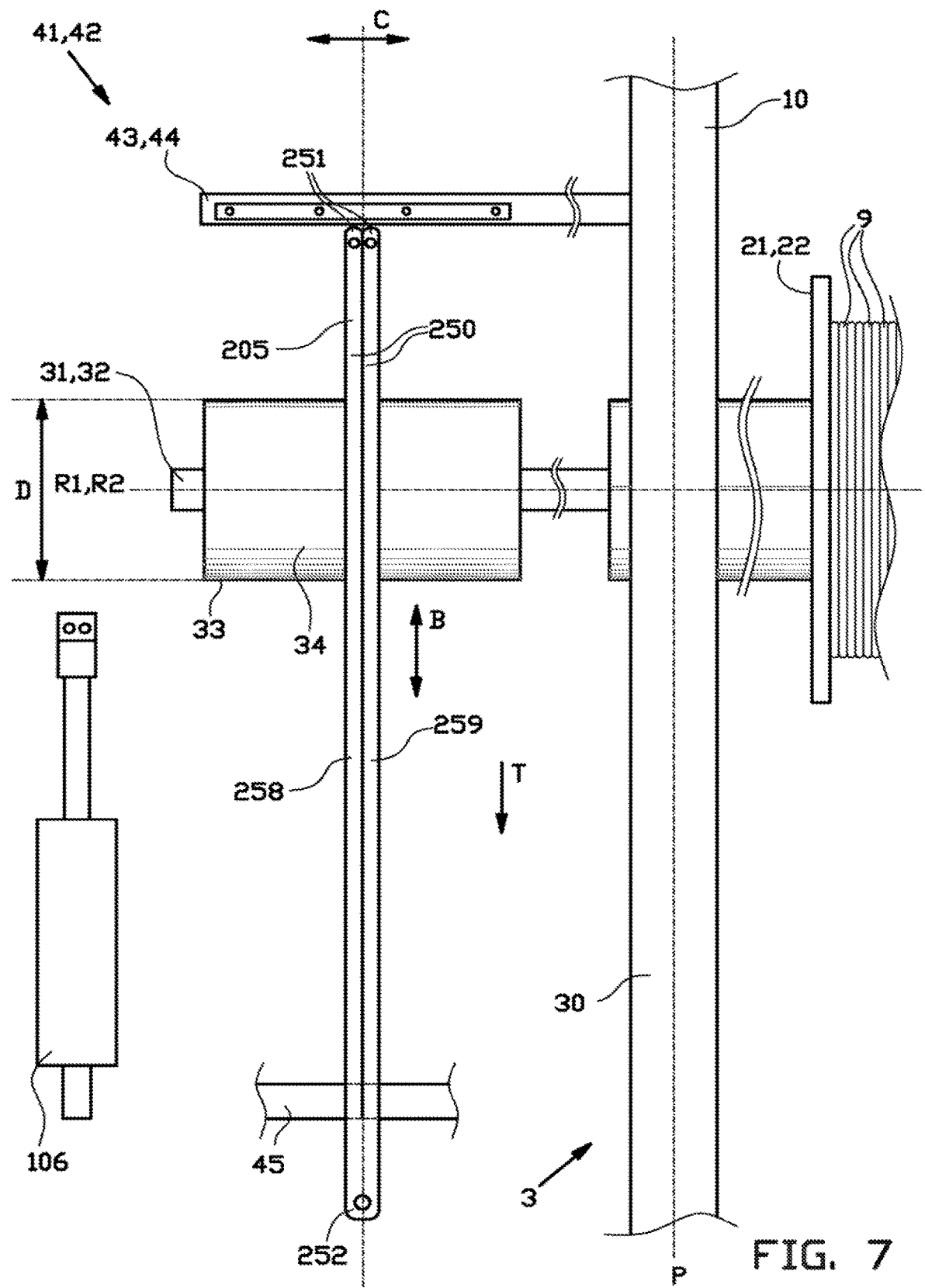
FIGS. 7, 8 and 9 show in side view the steps of mounting an alternative creel bobbin brake according to a second embodiment of the invention to the creel bobbin holder of FIG. 2.
Figure 8:
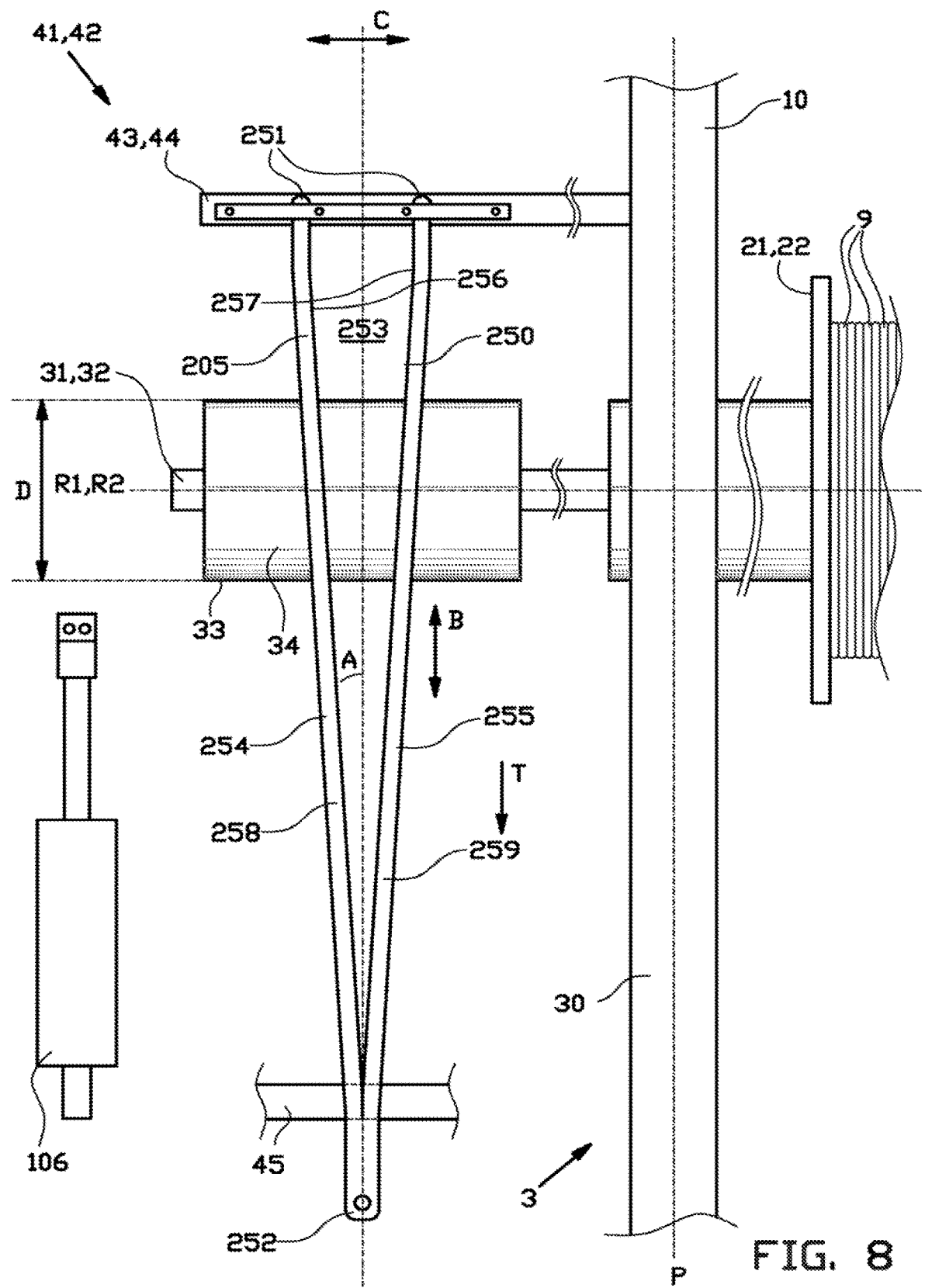
Figure 9:
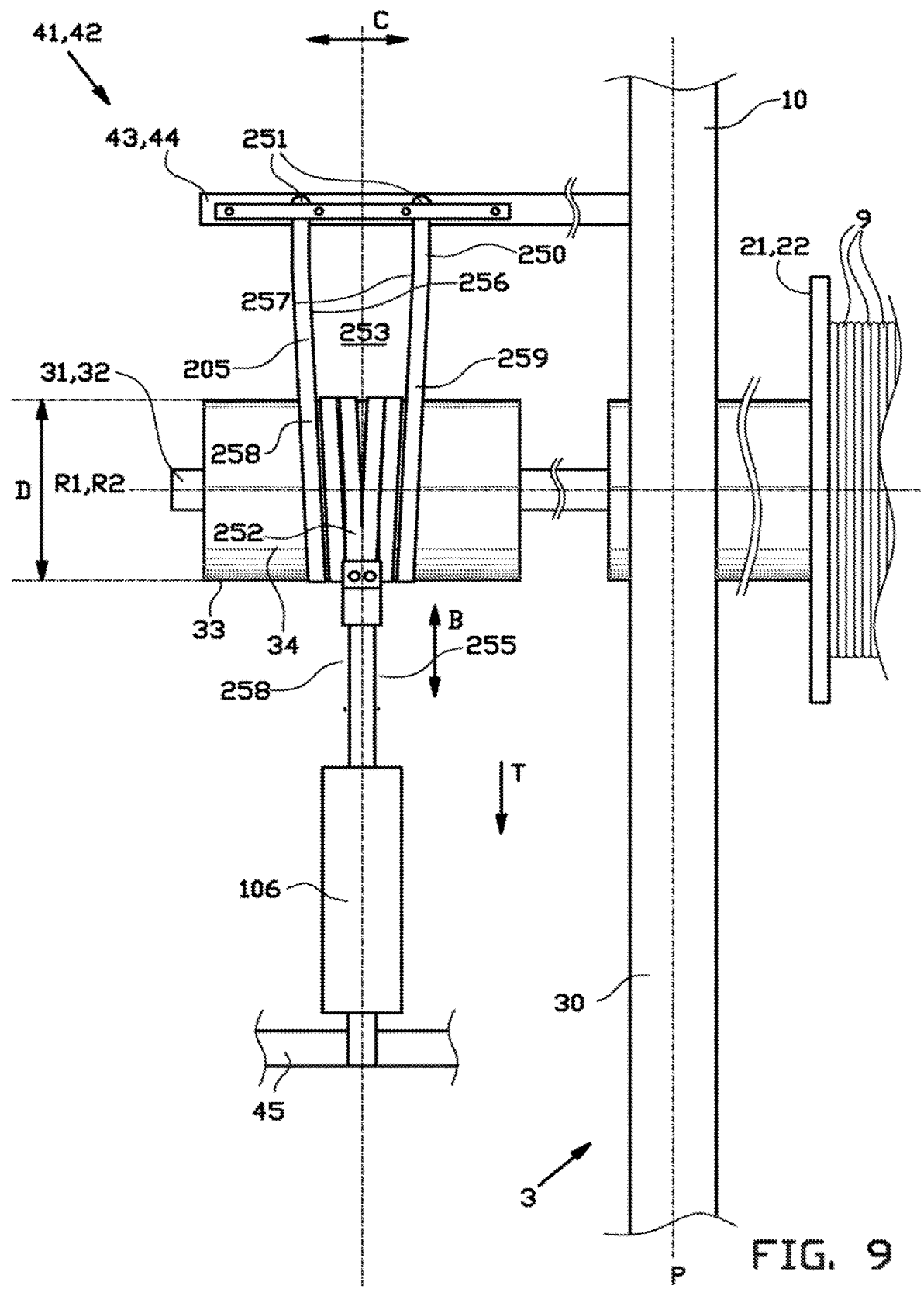

FIGS. 7, 8 and 9 show an alternative strap 205 according to a second embodiment of the invention for use in the previously discussed creel bobbin brake 41. The alternative strap 205 again has a first end 251, a second end 252 and a strap body 250 extending between the first end 251 and the second end 252 in the longitudinal direction B. Moreover, the strap 205 has an opening 253, a first outer edge 254, a second outer edge 255, a first inner edge 256 and a second inner edge 257 similar to the strap 5 of FIGS. 3-6. The alternative strap 205 differs from the aforementioned strap 5 in that its opening 253 extends up to and opens at the first end 251 in the longitudinal direction B. In other words, the opening 253 extends up to the edge and/or debouches at the first end 251. The opening 253 thus divides the strap body 250 into a first leg 258 and a second leg 259 that terminate at the first end 251. Said legs 258, 259 can be spread apart at the first end 251, as shown in FIG. 8, to provide a different and/or an adjustable taper angle A. The opening 253 tapers to a smallest width that is chosen in a range zero to the smallest width of the strap body 250. The legs 258, 259 are arranged to be mounted to the first mounting member 43, 44 with the legs 258, 259 spread apart at a certain taper angle A that allows for at least one and a half revolutions of the alternative strap 205 about the shaft 31, 32. The second end 251 of the alternative strap 205 is arranged to be inserted through the opening 253 several times and to be mounted to the second mounting member 245, e.g. with the use of the tensioner 106, in the same manner as the aforementioned strap 5.

The tensioners 6, 106 are arranged for providing a tension in accordance with the type of wire 9 that is used. For fabric wires 9, which are relatively light, the tension is within a range of 1 to 10 Newton, preferably 1.3 to 5 Newton and most preferably approximately 1.5 Newton. For steel wires 9, which are relatively heavy, the tension is within a range of 5 to 15 Newton, preferably 8 to 12 Newton and most preferably approximately 10 Newton. The tensioners 6, 106 preferably comprise low friction pneumatic cylinders which can accurately and/or steplessly set the tension by increasing and/or decreasing the pneumatic pressure. The low friction prevents that a build-up of pneumatic pressure in the pneumatic cylinder that in the prior art cylinders causes sudden or abrupt jolts while setting the tension.

A creel method for mounting the strap 5 in the previously discussed creel bobbin brake 41, 42 will be briefly elucidated below with reference to FIGS. 3-6.

FIG. 3 shows the situation in which the strap 5 is initially mounted only with its first end 51 to the first mounting member 43, 44. The second end 52 is unmounted and/or freely movable. There is no tension in the strap body 50.

Figure 4:
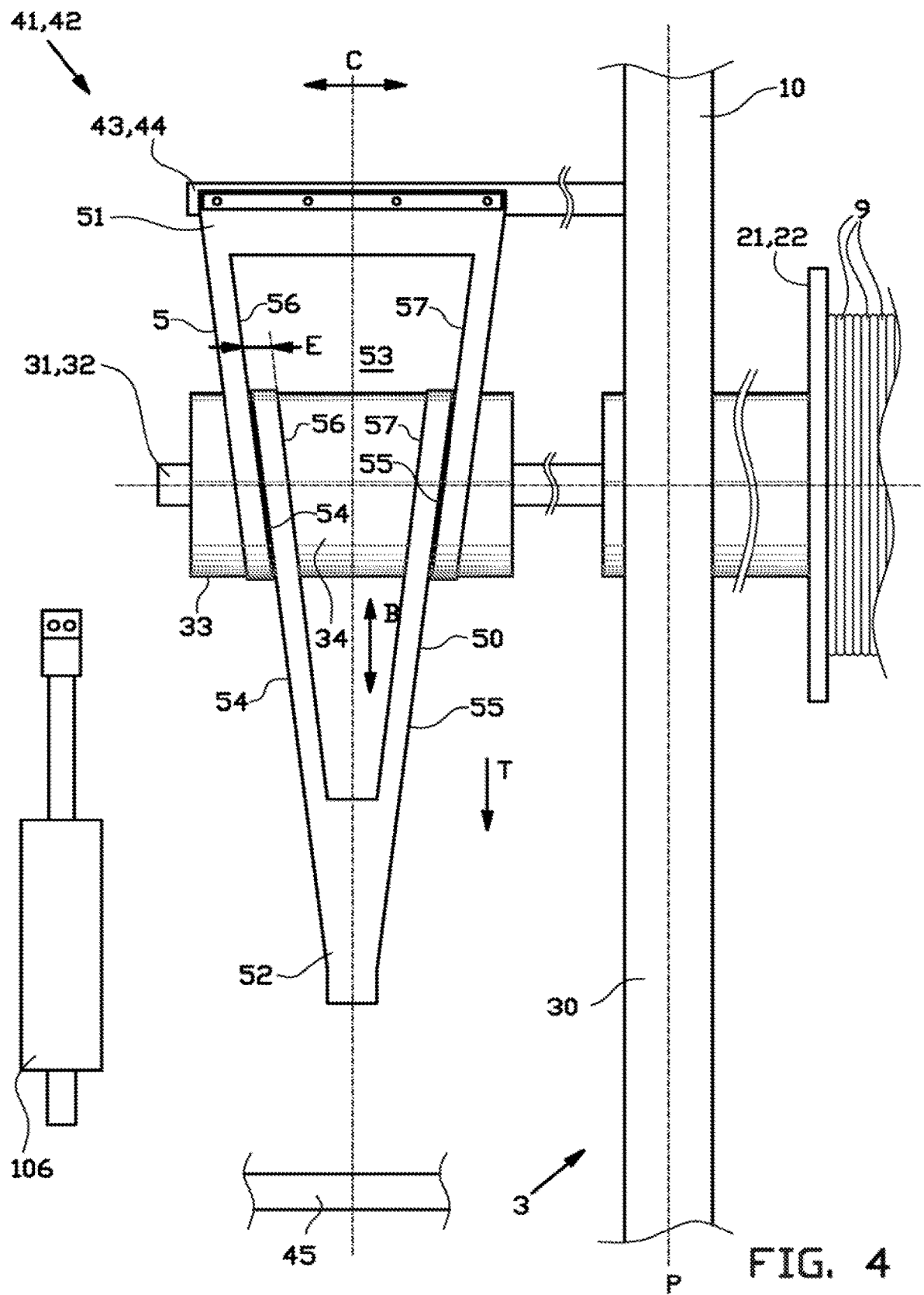
FIGS. 4 and 5 show in side view the steps of mounting the creel bobbin brake to the creel bobbin holder of FIG. 2.

FIG. 4 shows the second end 52 being wound around the brake surface 33 of the brake drum 34 over a single revolution, i.e. 360 degrees. The second end 52 is inserted and/or pulled through the opening 53 in the strap body 50. Note that the outer edges 54, 56 now extend alongside and on the inside of the inner edges 55, 57 of the first winding.

FIG. 5 shows the second winding of the strap 5 around the brake surface 33 of the brake drum 34. The strap 5 has now been wound over a total of 720 degrees about the brake surface 33. The second end 52 is again inserted and/or pulled through the opening 53 in the strap body 53. And again, the outer edges 54, 56 of the second winding extend alongside and on the inside of the inner edges 55, 57 of the first winding.

FIG. 6 shows the third and optional winding of the strap 5 around the brake surface 33 of the brake drum 34. The strap 5 has now been wound over a total of 1080 degrees about the brake surface 33. The second end 52 is again inserted and/or pulled through the opening 53 of the strap body 50. And again the outer edges 54, 56 of the third winding extend alongside and on the inside of the inner edges 55, 57 of the second winding. The second end 52 now extends from the brake surface 33 towards the second mounting member 45. In this exemplary embodiment, the second end 52 is mounted to the second mounting member 45 with a tensioner 106. As mentioned before, the second end 52 may also be mounted directly to the second mounting member 45, as shown in FIG. 2, provided that the second mounting member 45 itself is connected via a tensioner 6 to the base member 30.

Figure 14:
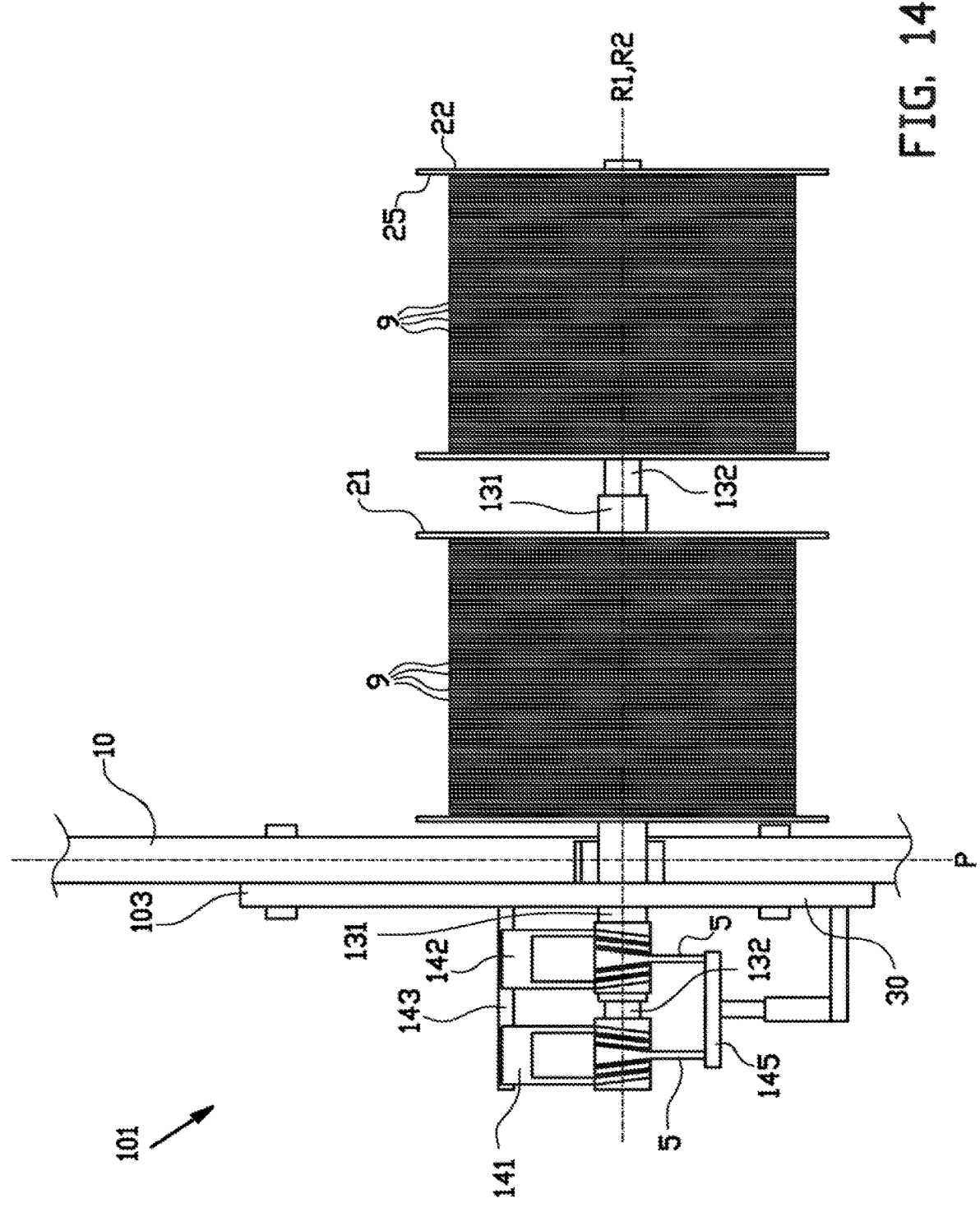
FIG. 14 shows a side view of an alternative creel bobbin holder according to a third embodiment of the invention.

FIG. 14 shows an alternative creel 101 according to a third embodiment of the invention. The alternative creel 101 comprises a creel bobbin assembly 103 that has a first shaft 131 and a second shaft 132 which are placed coaxially. In particular, the first shaft 131 is hollow and the second shaft 132 is placed concentrically within the first shaft 131. The first shaft 131 and the second shaft 132 are independently rotatable. Hence, the first rotation axis R1 and the second rotation axis R2 coincide and/or are collinear. The first creel bobbin 21 is arranged to be supported on the first shaft 131 nearest to the creel plane P. The second shaft 132 protrudes from the first shaft 131 in an axial direction parallel to the first rotation axis R1 away from the creel plane P to support the second creel bobbin 22 coaxially at a side of the first creel bobbin 21 facing away from the creel plane P. Hence, the first creel bobbin 21 and the second creel bobbin 22 can be supported coaxially side-by-side in the axial direction parallel to the first rotation axis R1 and/or the second rotation axis R2. Again, the creel bobbins 21, 22 are both supported at the same side of the creel plane P.

As shown in FIG. 14, the first shaft 131 and the second shaft 132 extend through the creel plane P to the opposite side of said creel plane P. At said opposite sides, the alternative creel 101 is again provided with creel bobbin brakes 141, 142 that essentially operate in the same way as the previously discussed creel bobbin brakes 41, 42. However, like the creel bobbins 21, 22 and their shafts 131, 132, the creel bobbin brakes 141, 142 are also arranged coaxially. In particular, the first shaft 131 is hollow and accommodates the concentrically placed second shaft 132 which protrudes from said first shaft 131 at the opposite side of the creel plane P. The creel bobbin brakes 141, 142 are arranged side-by-side in an axial direction parallel to the first rotation axis R1 and/or the second rotation axis R2 so that their respective straps 5 may be wound around the shafts 131, 132 over at least three revolutions in the same way as previously described.

The side-by-side coaxial arrangement also allows the creel bobbin brakes 141, 142 to be mounted between a common first mounting member 143 and a common second mounting member 145, thus simplifying the construction of the creel bobbin assembly 103.

Figure 10:
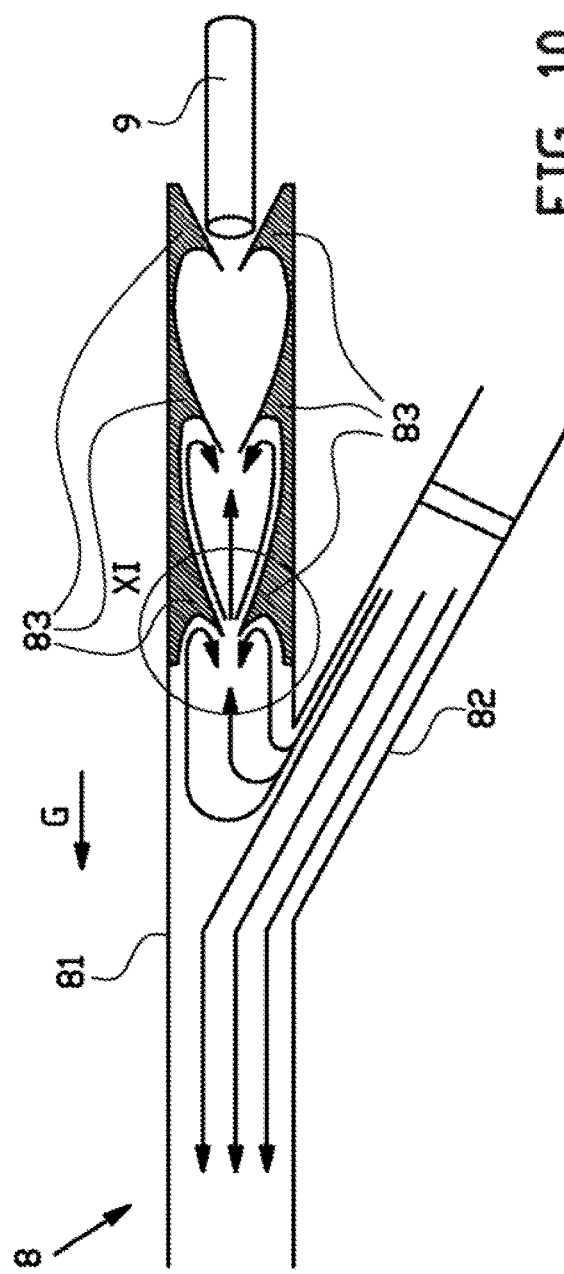
FIGS. 10 and 11 show details of a guiding tube that is used in the creel of FIG. 1.

As shown in FIG. 1, the creel 1 further comprises a plurality of guiding tubes 8 for guiding and/or leading the wires 9 towards a wire collector or an extruder (not shown) at the front of the creel 1. Each guiding tube 8 is arranged for receiving a wire 9 from an individual creel bobbin 21, 22. As shown in detail in FIG. 10, each guiding tube 8 comprises a main channel 81 and an air channel 82 that merges oblique with the main channel 81 in a direction of guidance G. The air channels 82 are connected in fluid communication to a source of pressurized air. The pressurized air enters the air channels 82 and is arranged for blowing the wires 9 through the respective main channels 81 towards the wire collector or the extruder in the direction of guidance G. Preferably, the source of pressurized air can be individually switched on and off for each guiding tube 8 by a plurality of valves (not shown). Said valves are preferably manually operated. The pressurized air can be switched on when a new creel bobbin 21, 22 is mounted to the creel 1 and the wire 9 thereof is not yet engaged by the wire collector or the extruder.

Figure 11:
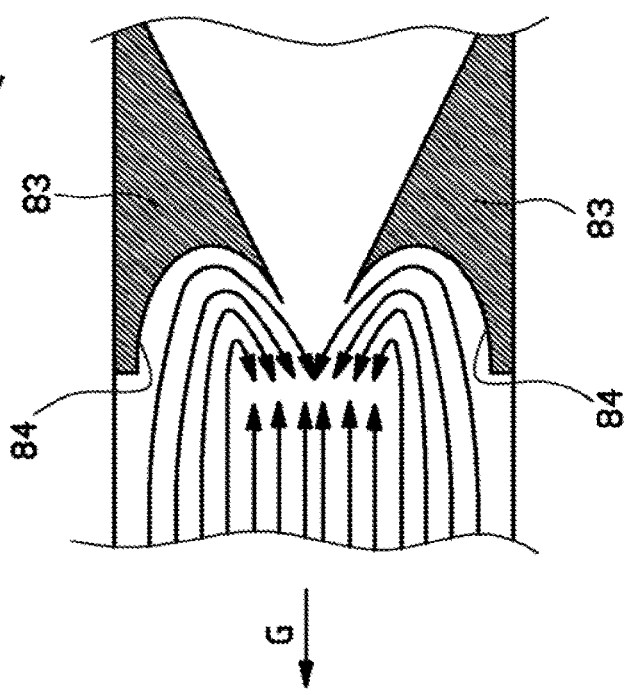

As shown in more detail in FIG. 11, the main channel 81 of the guiding tube 8 is preferably provided with one or more air leak stops 83 arranged in the area upstream of the position where the air channel 82 merges with the main channel 81. Each air leak stop 83 comprises a disruption surface 84 for that faces in the direction of guidance G to disrupt air flow leaking upstream in the direction of guidance G. This can improve the suction of the wire 9 into the main channel 81. Hence, the wire 9 can be sucked into the main channel 81 more easily. More in particular, the wire 9 does not have to be stuck as far into the main channel 81 before being sucked in when comparing it with the prior art guiding tubes.

Figure 12:
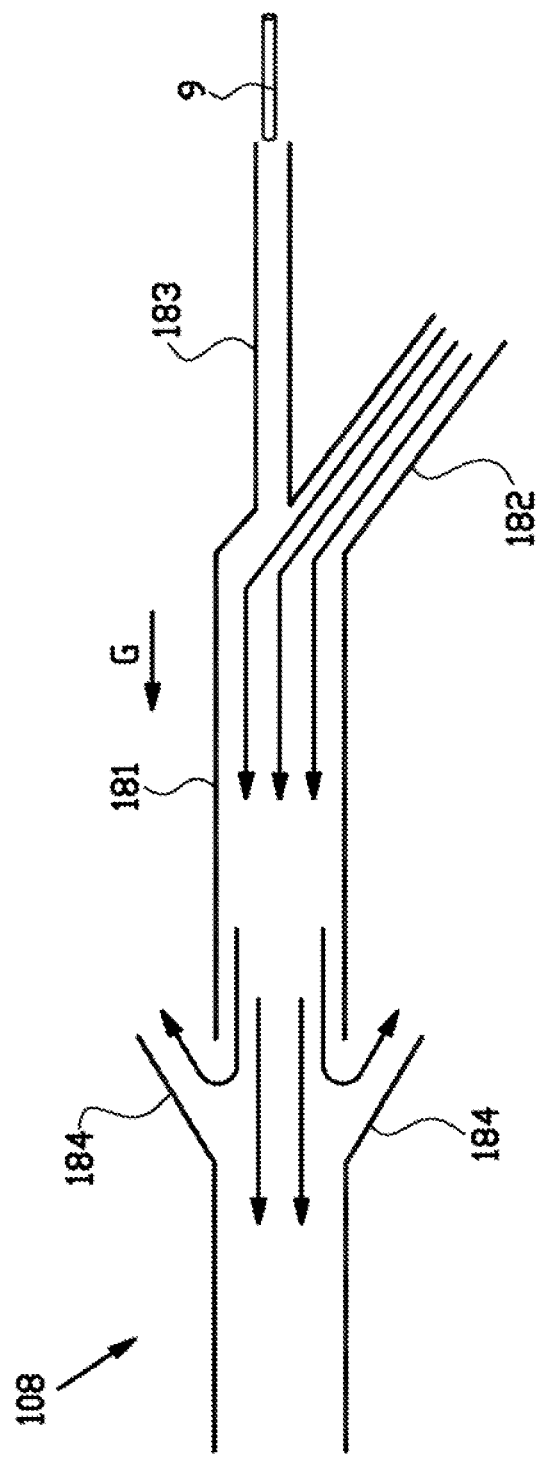
FIG. 12 shows a detail of an alternative guiding tube that can be used in the creel of FIG. 1.

FIG. 12 shows an alternative guiding tube 108 that is provided with a main channel 181 and an air channel 182 that merges oblique with the main channel 181 in the direction of guidance G. The alternative guiding tube 108 further comprises a wire inlet 183 that has a significantly smaller diameter than the main channel 181. The smaller diameter can prevent that air from the air channel 182 leaks back into the wire inlet 183. At a position spaced apart from the wire inlet 183 in the direction of guidance G, the main channel 181 is provided with one or more air pressure outlets 184 to reduce the pressure build-up in the main channel 183. Preferably, the air pressure outlets 184 are angled back with respect to the direction of guidance G to prevent that the wire 9 accidentally exits the main channel 181 through one of the one or more air pressure outlets 184. The reduced air pressure downstream of the one or more air pressure outlets 184 can prevent that the pressure build-up counteracts the feeding of the wire 9 in the direction of guidance G.

Figure 15:
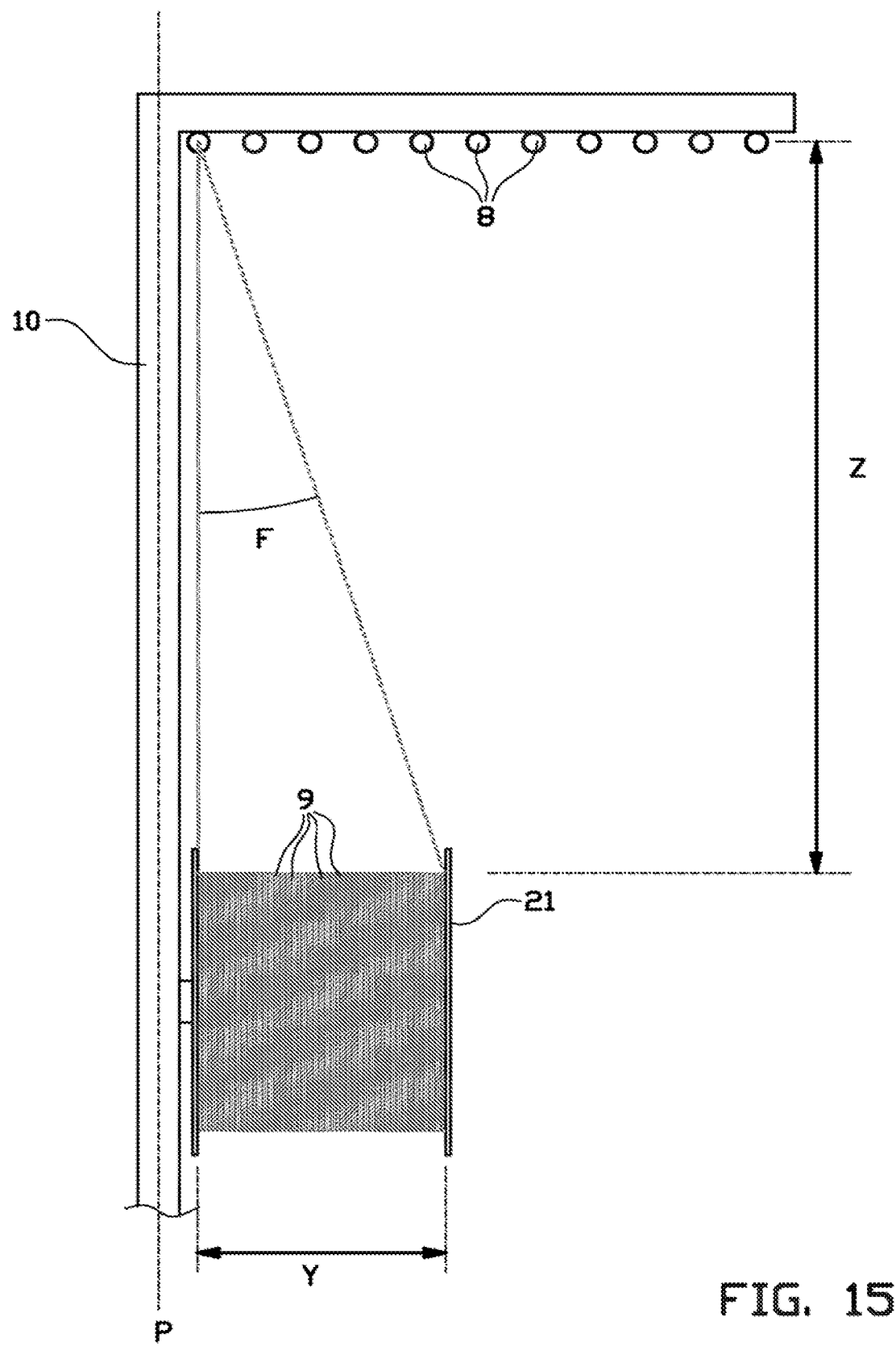
FIG. 15 shows a side view of the positioning of one of the creel bobbins in the creel according to FIG. 1.

As further shown in FIG. 1, the creel 1 preferably has to meet certain ergonomic requirements. In particular, it is important that the lowest creel bobbins 21, 22 in the creel 1 are at a certain minimum height H1 to prevent that an operator has to reach too low to replace said lowest creel bobbins 21, 22. Similarly, the highest creel bobbins 21, 22 in the creel 1 should not be placed higher than a maximum height H2 to prevent that the operator has to reach too high to replace said highest creel bobbins 21, 22. However, at the same time, the creel bobbins 21, 22 should be spaced apart from their respective guiding tubes 8 sufficiently. In particular, with reference to FIG. 15, it is noted that the wire 9 makes a so-called fleet angle F between the wire 9 unwinding from the extreme left and the extreme right of the creel bobbin 21, 22 and an imaginary center line M normal to the axial direction of the creel bobbin 21, 22. Said fleet angle F should be less than 10 degrees, preferably less than five degrees and most preferably less than three degrees. Hence, for a given bobbin width Y, the minimum distance Z between the circumference of the creel bobbin 21, 22 and the respective guiding tube 8 can be calculated.

Based on the minimum height H1 of the lowest creel bobbins 21, 22, the maximum height H2 of the highest creel bobbins 21, 22 and the minimum distance Z between the creel bobbins 21, 22 and their respective guiding tubes 8, the configuration of the creel 1 according to FIG. 1 was conceived. In this configuration, the lower half of the creel bobbins 21, 22 are arranged to feed their wires 9 to the guiding tubes 8 at the upper end of the creel 1, while the higher or upper half of the creel bobbins 21, 22 are arranged to feed their wires 9 to the guiding tubes 8 at the lower end of the creel 1. Hence, the creel height can be reduced significantly while meeting both the requirements for the minimum height H1, the maximum height H2 as well as the minimum distance Z.

Figure 16:
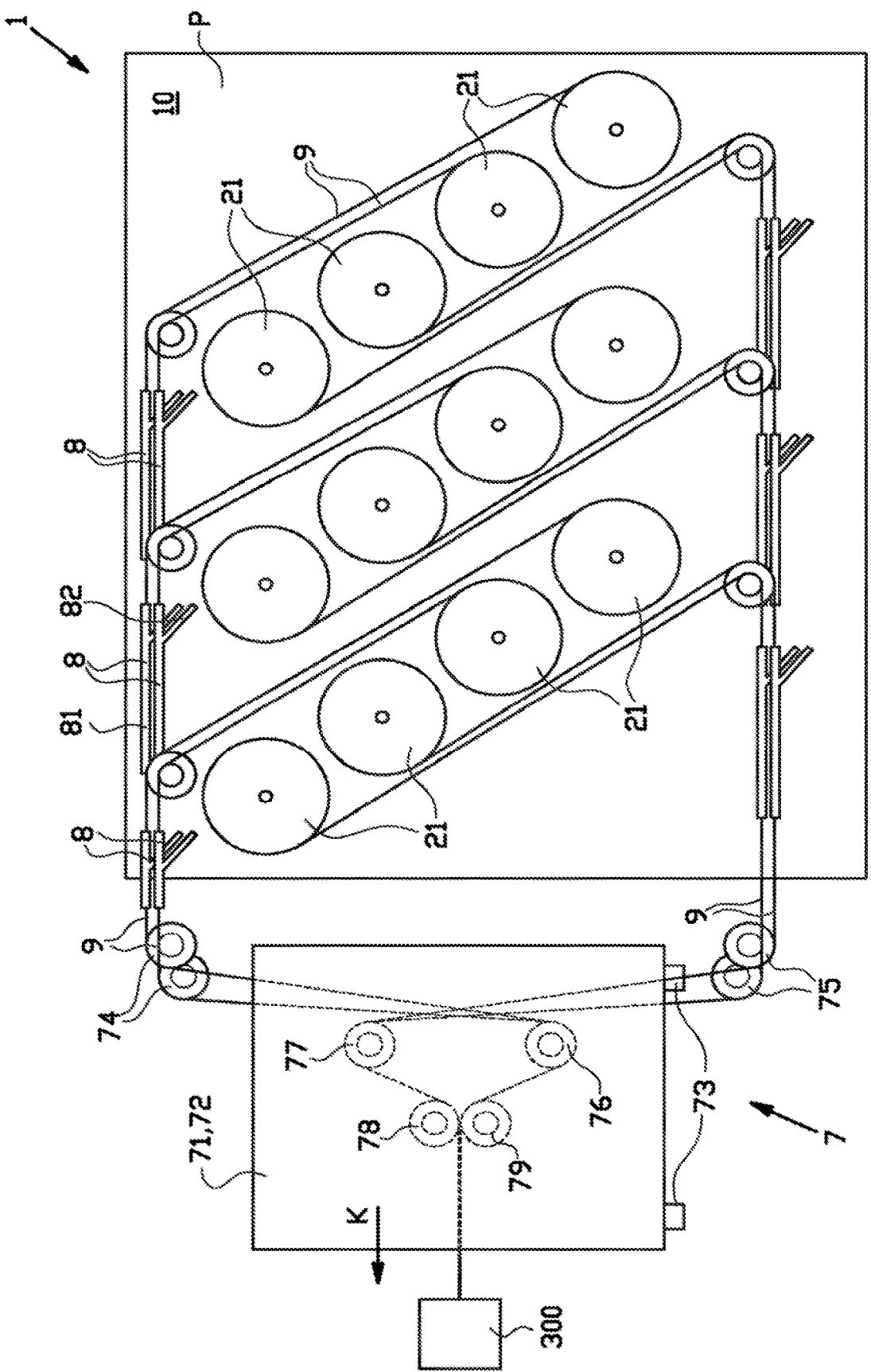
FIG. 16 shows a front view of the creel according to FIG. 1 in combination with a wire collector according to a fourth embodiment of the invention for collecting the wires from the plurality of bobbins.

As the previously discussed embodiments of the invention allow for an increased number of creel bobbins 21, 22 within the creel 1, 101, the number of wires 9 also increases significantly. FIG. 16 shows a wire collector 7 for use with the creel 1 according to FIG. 1. Said wire collector 7 is used for collecting the wires 9 originating from the individual creel bobbins 21, 22 and directing the collected wires 9 towards a downstream station 300, e.g. an extruder head where the wires 9 are embedded in elastomeric material, in an output direction K. In this exemplary embodiment, the output direction K is parallel or substantially parallel to the creel plane P. In FIGS. 17A and 17B, the downstream station 300 is arranged in or in-line with the creel plane P. In FIGS. 18A and 18B, the downstream station 300 is out-of-line with and in the center between both creel planes P.

In FIG. 16, only the first creel bobbins 21 are shown for simplicity. The wire collector 7 may however also be used for collecting the wires 9 from the second creel bobbins 22, as schematically shown in FIGS. 17A and 17B. As shown in FIGS. 17A, 17B, the creel 1 has a plurality of creel bobbins 21, 22 on either side of the creel plane P. In FIGS. 17A and 17B, the wire collector 7 is used in combination with a single creel 1. In FIGS. 18A and 18B, the wire collector 7 is used in combination with a double-creel configuration, i.e. in combination with a first creel 11 and a second creel 12, each being similar or identical to the creel 1 of FIG. 1.

The wire collector 7 comprises a first collection section 71 for collecting the wires 9 from a first group of creel bobbins 21, 22 and a second collection section 72 for collecting the wires 9 from a second group of creel bobbins 21, 22. In FIGS. 17A and 17B, the first group comprises the creel bobbins 21, 22 at one side of the creel plane P and the second group comprises the creel bobbins 21, 22 at the opposite side of the creel plane P. In FIGS. 18A and 18B, the first group comprises the creel bobbins 21, 22 from the first creel 11 and the second group comprises the creel bobbins 21, 22 from the second creel 12.

In both embodiments, the first collection section 71 and the second collection section 72 are individually movable in a switching direction S transverse or perpendicular to the creel plane P. In particular, the first collection section 71 and the second collection section 72 are arranged to be alternately moved into a position into alignment with the downstream station 300 in the output direction K. Hence, when the first collection section 71 is actively outputting its collected wires 9 to the downstream station 300, as shown in FIGS. 17A and 18A, the wires 9 in the second collection section 72 can be organized and/or prepared so that when the creel bobbins 21, 22 of the group associated with the active first collection section 71 are empty, the wire collector 7 can easily switch from the creel bobbins 21, 22 of the empty group to the creel bobbins 21, 22 of the group associated with the second collection section 72, as shown in FIGS. 17B and 18B. In this exemplary embodiment, the collection sections 71, 72 are arranged on one or more rails 73 extending in the switching direction S. Alternatively, the collection sections 71, 72 may be arranged on carriages that run over the factory floor.

As best seen in FIG. 16, each collection section 71, 72 comprises a set of upper rollers 74 located at or near the respective creel 1 for receiving the wires 9 from the guide tubes 8 at the top of the creel 1 and a set of lower rollers 75 for receiving the wires 9 from the guide tubes 8 at the bottom of the creel 1. The wire collector 7 further comprises a first set of collector rollers 76 and a second set of collector rollers 77 for receiving the wires 9 from the upper rollers 74 and the lower rollers 75, respectively. The orientation of said collector rollers 76, 77 can be tilted about a vertical axis, as schematically shown in FIGS. 17A, 17B, 18A and 18B, to follow or adjust for the movement of the collection sections 71, 72 in the switching direction S relative to the rollers 74, 75 at the creel 1, 11, 12. Each collection section 71, 72 further comprises a set of output wheels 78, 79 for bringing the wires 9 from the respective collector rollers 76, 77 together and for outputting said wires 9 in the output direction K towards the downstream station 300.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

The invention claimed is:

1. A creel comprising a plurality of creel bobbins, a plurality of guiding tubes located at the lower end of the creel and a plurality of guiding tubes located at the upper end of the creel, wherein each guiding tube is arranged for receiving a wire from an individual creel bobbin, wherein the lower half of the creel bobbins are arranged to feed their wires to the guiding tubes at the upper end of the creel, while the upper half of the creel bobbins are arranged to feed their wires to the guiding tubes at the lower end of the creel.

2. The creel according to claim 1, wherein, for each guiding tube receiving a wire from said individual creel bobbin, the wire in use extends from the creel bobbin towards the guiding tube at a fleet angle with respect to an imaginary center line normal to the axial direction of the creel bobbin, wherein the wire extends at a maximum fleet angle when the wire is unwinding from the extreme left and the extreme right of the creel bobbin, wherein the creel bobbin has a bobbin width and a minimum distance between the circumference of the creel bobbin and the guiding tube, wherein the bobbin width and the minimum distance are chosen such that the maximum fleet angle is less than ten degrees.

3. The creel according to claim 2, wherein the maximum fleet angle is less than five degrees or less than three degrees.

4. A method using the creel according to claim 1, wherein the method comprises the steps of:
   feeding the wires of the lower half of the creel bobbins to the guiding tubes at the upper end of the creel; and
   feeding the wires of the upper half of the creel bobbins to the guiding tubes at the lower end of the creel.

* * * * *